United States Patent
Iida

[11] 3,878,547
[45] Apr. 15, 1975

[54] SCALE INDICATOR DEVICE IN A ZOOM LENS

[75] Inventor: Yozo Iida, Tokyo, Japan

[73] Assignee: Nippon Kogaku K.K., Tokyo, Japan

[22] Filed: Jan. 31, 1974

[21] Appl. No.: 438,407

[30] Foreign Application Priority Data
Feb. 5, 1973 Japan.................................. 48-15541

[52] U.S. Cl.................................. 354/198; 350/187
[51] Int. Cl. .............................................. G03b 3/02
[58] Field of Search ........... 354/196, 197, 198, 286; 350/187, 255

[56] References Cited
UNITED STATES PATENTS

| | | | |
|---|---|---|---|
| 3,465,662 | 9/1969 | Koshuiose............................ | 350/187 |
| 3,494,271 | 2/1970 | Muryor................................ | 350/255 |
| 3,680,459 | 8/1972 | Okura................................. | 354/198 X |
| 3,731,987 | 5/1973 | Iida..................................... | 350/187 |

Primary Examiner—Samuel S. Matthews
Assistant Examiner—O'Connor. E. M.
Attorney, Agent, or Firm—Fitzpatrick, Cella, Harper & Scinto

[57] ABSTRACT

A scale indicator device in a zoom lens comprises a first and a second magnification changing lens frame member slidable within a stationary lens barrel, a cover and an index ring both formed integrally with the stationary lens barrel, an inner cylinder rotatably mounted over the stationary lens barrel and an outer cylinder mounted over the inner cylinder. The inner cylinder is such that its rotation causes sliding movement of one of the magnification changing lens frame members. The outer cylinder is slidable with respect to the inner cylinder and rotatably therewith to cause sliding movement of the other frame member. An operating ring is formed integrally with the outer cylinder and provided with a close-up scale and a zooming scale. Upon rotation of the outer cylinder to achieve the zooming operation the close-up focusing scale is concealed by the cover. When the outer cylinder is slidably moved along the inner cylinder to achieve close-up focusing the zooming scale is concealed by the index ring.

1 Claim, 3 Drawing Figures

SCALE INDICATOR DEVICE IN A ZOOM LENS

BACKGROUND OF THE INVENTION

1. Field of the Invention

This invention relates to a zoom lens for use with photographic cameras or motion picture cameras, and more particularly to a scale indicator device in such zoom lens for selectively indicating the focal distance and the object distance of the zoom lens.

2. Description of the Prior Art

A zoom lens has recently been proposed which can perform the function as a zoom lens and the function as a close-up lens by the zooming ring of the lens being operated in two different manners. In such zoom lenses, two functionally different scales such as a zoom focal distance scale and a close-up distance scale are provided on a common operating member so as to indicate the two different manners of operation of the operating member, and the user may selectively use one of the two scales during photography.

However, such zoom lens has been disadvantageous in that the user may by mistake set the lens to the close-up distance scale when he should set it to the focal distance scale or the user may by mistake set the lens to the focal distance scale where he should set it to the close-up distance scale, which in turn may result in his missing a picture or providing an undesired photographic effect.

In addition, the photographer has no means for making sure of which scale he is using and accordingly, he is forced to feel very nervous and troubled with very cumbersome procedures of operation during picture-taking.

SUMMARY OF THE INVENTION

It is an object of the present invention to eliminate the above-noted disadvantages including the cumbersome procedures involved in picture-taking operation and the possibility of malfunction by providing a zoom lens with a scale indicator device which indicates to the user only one of two functionally different scales matching the purpose then intended by the user in such a manner that upon change-over of the zooming ring into one of its two different functions, e.g. zoom lens function, only the focal distance scale of the zoom lens is visibly indicated with the other scale automatically concealed and upon change-over of the zooming ring into the other function, only the scale corresponding to said other function is visibly indicated while the focal distance scale concealed.

To achieve such object, the scale indicator device in the zoom lens according to the present invention comprises a stationary lens barrel, a first and a second magnification changing lens frame member slidably mounted within the stationary lens barrel, a cover and an index ring both formed integrally with the stationary lens barrel, an inner cylinder rotatably mounted over the stationary lens barrel so that rotation of the inner cylinder causes sliding movement of one of the magnification changing lens frame members, an outer cylinder mounted over the inner cylinder for sliding movement with respect thereto and for rotation therewith to cause sliding movement of the other of the magnification changing lens frame members, and an operating ring formed integrally with the outer cylinder and provided with a close-up scale and a zooming scale. Thus, the close-up scale may be concealed by the cover upon rotation of the outer cylinder during the zooming effected by the relative movement of the two magnification changing lens frame members, and when the outer cylinder is slidably moved along the optical axis to change over the lens into the close-up function, the zooming scale may be concealed by the index ring.

The invention will become more fully apparent from the following detailed description of an embodiment thereof taken in conjunction with the accompanying drawings.

DESCRIPTION OF THE PREFERRED EMBODIMENTS

Figure 1:
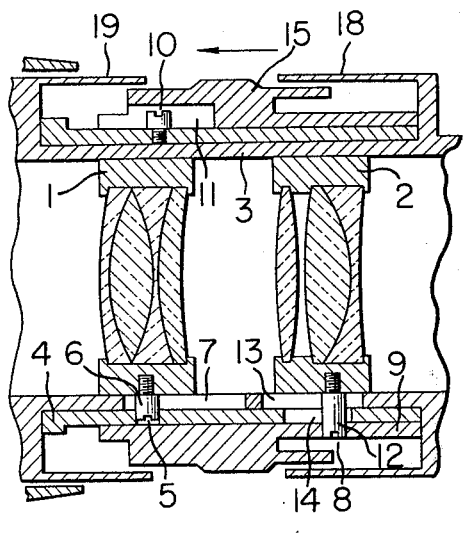
FIG. 1 is a fragmentary cross-sectional view of essential portions of the device according to an embodiment of the present invention.

Referring to FIG. 1, only the magnification changing lens group in the zoom lens is shown in cross section for simplicity of illustration.

A first magnification changing lens frame member 1 and a second magnification changing lens frame member 2 are slidably fitted within a stationary lens barrel 3. An inner cylinder 4 formed with a camming groove 5 for sliding the first magnification changing lens frame member 1 is rotatably mounted over the stationary lens barrel 3. A pin 6 is studded in the first magnification changing lens frame member 1 and extends through a translation guide groove 7 formed in the stationary lens barrel 3 and into the camming groove 5 of the inner cylinder 4. The first magnification changing lens frame member 1 is slidable with rotation of the inner cylinder 4. An outer cylinder 9 formed with a camming groove 8 for sliding the second magnification changing lens frame member 2 is mounted over the inner cylinder 4 for sliding movement with respect thereto by means of a pin 10 studded in the inner cylinder 4 and a translation guide groove 11 and for rotation with the inner cylinder 4 by means of the pin 10.

Thus, when the outer cylinder 9 is rotated, the first and second magnification changing lens frame members 1 and 2 are axially moved relative to each other with the aid of a pin 12 studded in the second magnification changing lens frame member 3, a translation guide groove 13 formed in the stationary lens barrel 3, an escapement groove 14 formed in the inner cylinder 4 and the camming groove 8 of the outer cylinder 9. Thus the ordinary zoom lens function is performed.

When the outer cylinder is slidably moved axially thereof (i.e. in the direction of arrow), this cylinder 9 alone is slid in such a direction to cause the second magnification changing lens frame member 2 to be moved with the aid of the camming groove 8 as much as the outer cylinder 9 has been moved, whereby the first and second magnification changing lens frame members 1 and 2 change their relative position to perform the close-up focusing function instead of the ordinary zoom lens function.

When the outer cylinder 9 is rotated from this position, the first and second magnification changing lens frame members 1 and 2 are moved relative to each other with the aid of the camming grooves 5 and 8 to change the photographing distance and accordingly the close-up magnification. An operating ring 15 is formed integrally with the outer cylinder 9 and serves as a zooming ring and also as a close-up focus ring.

Figure 2:
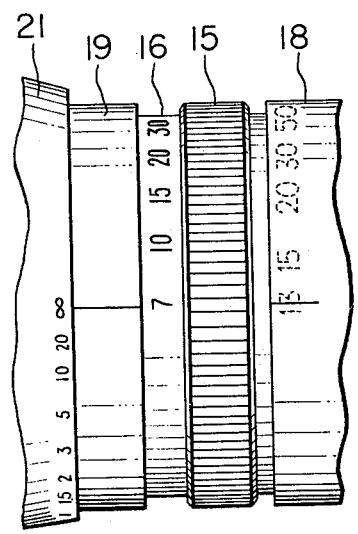
FIGS. 2 and 3 illustrate the operation of the present invention.
Figure 3:
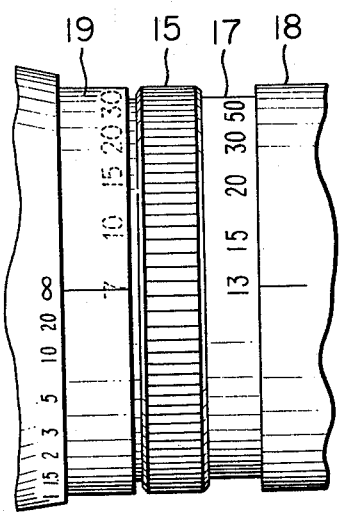

As is shown in FIGS. 2 and 3, the operating ring 15 is provided with a focal distance scale 16 and a close-up distance scale 17 in the front and rear portions thereof, respectively. If the lens is set to the function as a zoom lens, the zoom focal distance scale 16 alone is visibly exposed with the close-up distance scale 17 concealed invisibly within a cover 18 formed integrally with the stationary lens barrel 3, in the manner as shown in FIG. 2. If the operating ring 15 is slid in the direction of arrow (FIG. 1) to change over the lens into the function as a close-up lens, the focal distance scale 16 becomes concealed within an index ring 19 also integral with the stationary lens barrel 3 while the close-up distance scale 17 is visibly exposed out of the cover 18. In this manner, the user can see only the particular scale that corresponds to the function then desired. Reference numeral 21 designates a focus ring for the ordinary zoom lens.

Thus, according to the above-described construction of the present invention, when the operating ring provided with the functionally different scales is changed over into the function then desired, only the desired one of the scales may be visibly indicated thereon while the other scale is invisibly concealed upon such change-over, and this may be accomplished without any cumbersome procedure involved during photography. Also, any malfunctioning is eliminated. Moreover, the above-described effect can be achieved by a simple construction.

I claim:
1. A scale indicator device in a zoom lens comprising:
a stationary lens barrel;
a fiirst and a second magnification changing lens frame member slidably mounted within said stationary lens barrel;
an inner cylinder rotatably mounted over said stationary lens barrel so that rotation of said inner cylinder causes sliding movement of one of said magnification changing lens frame members;
an outer cylinder mounted over said inner cylinder for sliding movement with respect thereto and for rotation therewith to cause sliding movement of the other of said magnification changing lens frame members;
an operating ring formed integrally with said outer cylinder and provided with a close-up focusing scale and a zooming scale;
and a cover and an index ring both formed integrally with said stationary lens barrel and positioned outwardly of said close-up focusing scale and said zooming scale respectively;
whereby the close-up focusing scale is concealed by said cover upon rotation of said outer cylinder during the zooming effected by the relative movement of said two frame members, and the zooming scale is concealed by said index ring when said outer cylinder is slidably moved with respect to the inner cylinder to changeover the lens into the close-up focusing function.

* * * * *